(12) United States Patent
Gao et al.

(10) Patent No.: US 12,353,408 B2
(45) Date of Patent: Jul. 8, 2025

(54) SEMANTIC PARSING OF NATURAL LANGUAGE QUERY

(71) Applicant: Microsoft Technology Licensing, LLC, Redmond, WA (US)

(72) Inventors: Yan Gao, Redmond, WA (US); Lei Fang, Redmond, WA (US); Dongmei Zhang, Beijing (CN); Yan Xiao, Redmond, WA (US); Jian-Guang Lou, Redmond, WA (US); Maria del Mar Gines Marin, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/631,576

(22) PCT Filed: Jun. 18, 2020

(86) PCT No.: PCT/US2020/038292
§ 371 (c)(1),
(2) Date: Jan. 31, 2022

(87) PCT Pub. No.: WO2021/061231
PCT Pub. Date: Apr. 1, 2021

(65) Prior Publication Data
US 2022/0277005 A1   Sep. 1, 2022

(30) Foreign Application Priority Data

Sep. 29, 2019   (CN) .............................. 201910930771

(51) Int. Cl.
*G06F 16/2452* (2019.01)
*G06F 16/242* (2019.01)

(52) U.S. Cl.
CPC ...... *G06F 16/24522* (2019.01); *G06F 16/243* (2019.01)

(58) Field of Classification Search
CPC ............. G06F 16/24522; G06F 16/243; G06F 16/3344
See application file for complete search history.

(56) References Cited

U.S. PATENT DOCUMENTS

| 5,794,050 A | 8/1998 | Dahlgren et al. |
| 2004/0122661 A1 | 6/2004 | Hawkinson et al. |

(Continued)

FOREIGN PATENT DOCUMENTS

| CN | 109033063 A | 12/2018 |
| KR | 20160066236 A | 6/2016 |

(Continued)

OTHER PUBLICATIONS

Agrawal, Rohit, "DBIQS—An Intelligent System for Querying and Mining Databases using NPL", In Proceeding of International Conference on Information Systems and Computer Networks, Mar. 1, 2014, pp. 39-44.

(Continued)

*Primary Examiner* — Richard L Bowen
*Assistant Examiner* — Aryan D Toughiry
(74) *Attorney, Agent, or Firm* — Schwegman Lundberg & Woessner, P.A.

(57) ABSTRACT

According to implementations of the subject matter described herein, a solution for semantic parsing of the natural language query is provided. In this solution, a first natural language query for a first data table is received, where the first natural language query comprises words. A first set of knowledge representations associated with the first data table are obtained and the first set of knowledge representations describe, in a structured manner, knowledge required for understanding a natural language query for the first data table. The first natural language query is converted into a first sequence of symbols. A first computer-executable (Continued)

query corresponding to the first natural language query is generated. According to this solution, various kinds of knowledge representations from different fields can be represented into universal structured knowledge representations, such that the knowledge representations are used to assist in understanding semantics of natural language queries and generating corresponding computer-executable queries.

15 Claims, 8 Drawing Sheets

(56) References Cited

U.S. PATENT DOCUMENTS

| | | | |
|---|---|---|---|
| 2005/0043940 | A1 | 2/2005 | Elder et al. |
| 2015/0081711 | A1 | 3/2015 | Dixon et al. |
| 2017/0024465 | A1 | 1/2017 | Yeh et al. |
| 2020/0356363 | A1* | 11/2020 | Dewitt ............... G06F 8/75 |

FOREIGN PATENT DOCUMENTS

| | | | | |
|---|---|---|---|---|
| WO | 2018213530 | A2 | 11/2018 | |
| WO | WO-2018208813 | A1 * | 11/2018 | ......... G06F 16/2246 |

OTHER PUBLICATIONS

Androutsopoulos, et al., "Natural Language Interfaces to Databases—An Introduction", In Journal of Natural Language Engineering, vol. 1, Issue 1, Mar. 1995, 50 Pages.

Bouchou, Beatrice, "Using Transducers in Natural Language Database Query", In Proceeding of Applications of Natural Language to Information Systems Proceedings International Conference NLDB, Jun. 17, 1999, 15 Pages.

Chen, et al., "English Sentence Structures and Entity-Relationship Diagrams", In Journal of Information Sciences, vol. 29, Issue 2-3, May 1, 1983, pp. 127-149.

Chen, et al., "English, Chinese and ER Diagrams", In Journal of Data & Knowledge Engineering, vol. 23, Issue 1, Jun. 1, 1997, pp. 5-16.

Kunze, et al., "Putting People's Common Sense into Knowledge Bases of Household Robots", In Proceedings of Annual Conference on Artificial Intelligence, Sep. 21, 2010, 8 Pages.

Ma, et al., "Risk Prediction on Electronic Health Records with Prior Medical Knowledge", In Proceedings of the 24th ACM SIGKDD International Conference on Knowledge Discovery & Data Mining, Jul. 19, 2018, pp. 1910-1919.

"International Search Report and Written Opinion Issued in PCT Application No. PCT/US20/038292", Mailed Date : Sep. 29, 2020, 12 Pages.

Weissenborn, et al., "Dynamic Integration of Background Knowledge in Neural NLU Systems", In Repository of arXiv:1706.02596v3, Jun. 8, 2017, 13 Pages.

Zhang, et al., "Prior Knowledge Integration for Neural Machine Translation using Posterior Regularization", In Repository of arXiv:1811.01100v1, Nov. 2, 2018, 10 Pages.

Zhou, et al., "Commonsense Knowledge Aware Conversation Generation with Graph Attention", In Proceedings of the Twenty-Seventh International Joint Conference on Artificial Intelligence, Jul. 13, 2018, pp. 4623-4629.

Office Action Received for Chinese Application No. 201910930771.3, mailed on Apr. 16, 2024, 16 pages.

Second Office Action Received for Chinese Application No. 201910930771.3, mailed on Dec. 2, 2024, 14 pages.

Examination Report Received for Indian Application No. 202217015877, mailed on Mar. 4, 2025, 06 Pages.

Gupta, et al., "IQS-intelligent querying system using natural language processing", IEEE, International Conference on Electronics, Communication and Aerospace Technology, Apr. 2017, pp. 407-411.

Rejection Decision Received for Chinese Application No. 201910930771.3, mailed on Mar. 28, 2025, 13 Pages (English Translation Provided).

* cited by examiner

SEMANTIC PARSING OF NATURAL LANGUAGE QUERY

CROSS-REFERENCE TO RELATED APPLICATIONS

This application is a U.S. National Stage Filing under 35 U.S.C. 371 of International Patent Application Serial No. PCT/US20/038292, filed Jun. 18, 2020, which claims the benefit of priority to China Application No. 201910930771.3, filed Sep. 29, 2019, which are incorporated herein by reference in their entirety.

BACKGROUND

Natural Language Interface of the Database (NLIDB) allows users to query a database with natural languages so as to relieve the users from the burden of learning database query languages. This provides a better interaction experience than the conventional methods for database query with Structured Query Language (SQL). Natural language queries may be converted, via semantic parsing techniques, into computer-executable queries (such as SQL query) to retrieve answers from the database. Knowledge understanding is crucial in semantic parsing of natural language queries. When the database is queried with natural languages, users from different fields may generate natural language queries based on different types of background knowledge in respective fields. Accordingly, background knowledge is usually required to accurately understand the true semantics of the natural language queries and convert the natural language queries into computer-executable queries.

SUMMARY

In accordance with implementations of the subject matter described herein, a solution for semantic parsing of natural language query is provided. In this solution, a first natural language query for a first data table is received, where the first natural language query comprises a plurality of words. A first set of knowledge representations associated with the first data table are obtained and the first set of knowledge representations describe, in a structured manner, knowledge required for understanding a natural language query for the first data table. The first natural language query is converted into a first sequence of symbols by replacing, based on the first set of knowledge representations, the plurality of words with respective symbols in a predetermined symbol table. A first computer-executable query corresponding to the first natural language query is generated based on the first sequence of symbols. According to this solution, various kinds of knowledge from different fields can be represented into universal knowledge representations, such that the universal knowledge representations are utilized to assist in understanding semantics of the natural language queries and generating corresponding computer-executable queries.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter described herein.

BRIEF DESCRIPTION OF THE DRAWINGS

Throughout the drawings, the same or similar reference symbols refer to the same or similar elements.

DETAILED DESCRIPTION

Figure 1:
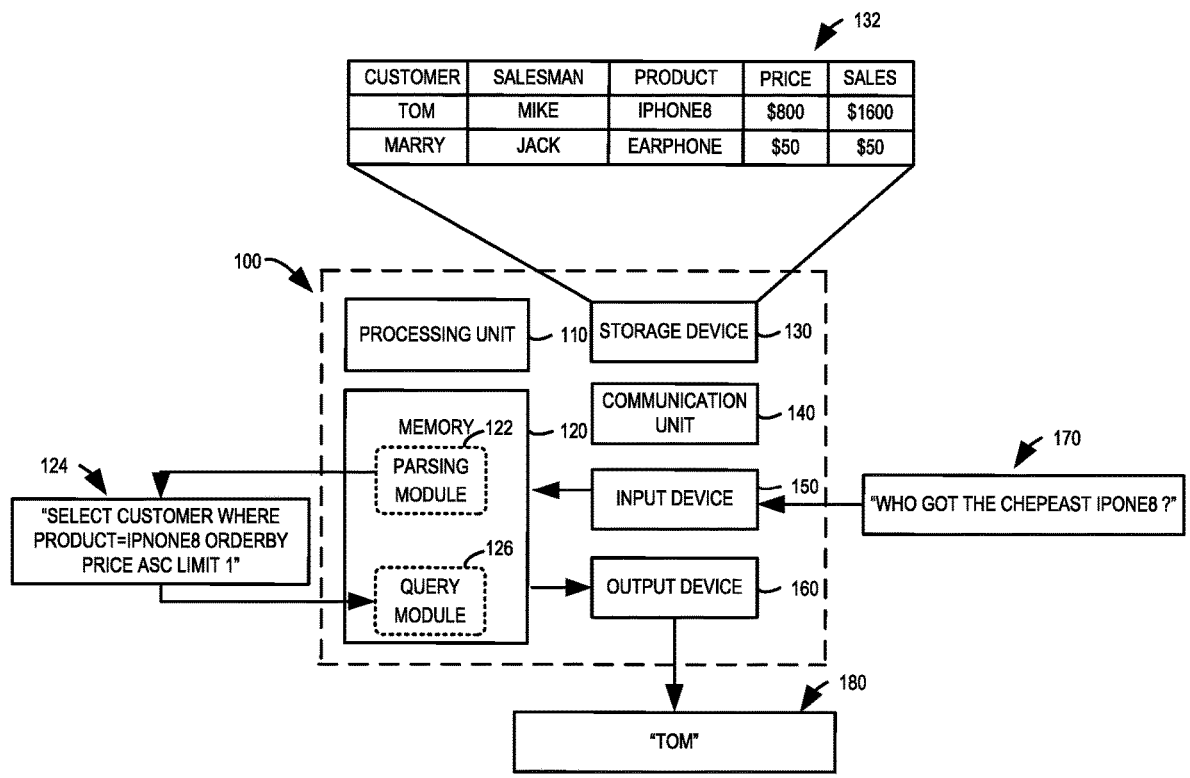
FIG. 1 illustrates a block diagram of a computing device in which implementations of the subject matter described herein can be implemented.

The subject matter described herein will now be discussed with reference to several example implementations. It is to be understood these implementations are discussed only for the purpose of enabling persons skilled in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As used herein, the term "natural language" refers to daily languages of human beings for written and verbal communications. Examples of a natural language include Chinese, English, German, Spanish, French, and the like. The term "machine language" refers to instructions which can be directly executed by computers and is also known as computer language or computer programming language. Examples of a machine language include Structured Query Language (SQL), SPARQL protocol, RDF Query Language (SPARQL), C/C+ Language, Java Language Python Language, and the like. As a machine language, the machine query language, such as SQL and SPARQL, is used for directing computers to perform query operations. In the following description, English will be taken as an example of the natural language. However, it should be understood that this is merely for the purpose of illustration and is not intended to restrict the scope of the subject matter described herein. Implementations of the subject matter described herein may be suitable for a variety of natural languages.

As mentioned above, Natural Language Interface of the Database (NLIDB) allows users to query a database with natural languages so as to relieve the users from the burden of learning database query languages. This provides a better interaction experience than the conventional methods for database query with Structured Query Language (SQL). Natural language queries may be converted, via semantic parsing techniques, into computer-executable queries (such as SQL query) to retrieve answers from the database.

Knowledge understanding is crucial in semantic parsing of natural language queries When the database is queried with natural languages, users from different fields may generate natural language queries based on different types of background knowledge in respective fields, for example (querying "the most expensive product" or "the oldest student in the second grade"). These natural language queries all relate to knowledge which cannot be found in the original database table. For example, "the most expensive" involves ranking product prices in a descending order and "the oldest in the second grade" relates to ranking the ages of students in the second grade in a descending order. Accordingly, the background knowledge is usually required to accurately understand the true semantics of the natural language query and achieve conversion from natural language queries into computer-executable queries.

In some conventional solutions, background knowledge required for understanding natural language queries is implicitly encoded into model parameters for parsing the natural language queries. In other words, the background knowledge will be extracted from training datasets during model training. However, there may be limitations on extracting the background knowledge from the training datasets. First of all, it is impossible to extract all background knowledge required for understanding the natural language queries from the limited training datasets. Further, the background knowledge may be updated along with time and development of the world. In these conventional solutions, the updated background knowledge can be encoded into model parameters only after the model is retrained, which obviously results in huge model training overhead.

In accordance with implementations of the subject matter described herein, there is provided a solution for semantic parsing of the natural language queries. According to this solution, various kinds of knowledge from different fields can be represented into universal structured knowledge representations (also known as "knowledge frame"). In the case where the knowledge is represented by the universal knowledge frame, when the model for parsing the natural language queries is trained, it is only required to understand the true semantics of the natural language queries with the aid of the universal knowledge frame. In face of natural language queries in new fields, the background knowledge from the new fields may be represented as universal knowledge frame. Since the model for parsing the natural language queries is trained based on the universal knowledge frame, the model, without being re-trained, can directly parse the natural language queries in the new fields based on the universal knowledge frame from the new fields.

Various example implementations of the solution are further described below with reference to the drawings.

Example Environment

FIG. 1 illustrates a block diagram of a computing device 100 that can implement a plurality of implementations of the subject matter described herein. It should be understood that the computing device 100 shown in FIG. 1 is only exemplary and shall not constitute any limitation on the functions and scopes of the implementations described by the subject matter described herein. As shown in FIG. 1, the computing device 100 includes a computing device 100 in the form of a general purpose computing device. Components of the computing device 100 may include, but is not limited to, one or more processors or processing units 110, a memory 120, a storage device 130, one or more communication units 140, one or more input devices 150, and one or more output devices 160.

In some implementations, the computing device 100 may be implemented as various user terminals or service terminals. The service terminals may be servers, large-scale computing devices, and the like provided by a variety of service providers. The user terminal, for example, is a mobile terminal, a fixed terminal or a portable terminal of any type, including a mobile phone, a site, a unit, a device, a multimedia computer, a multimedia tablet, Internet nodes, a communicator, a desktop computer, a laptop computer, a notebook computer, a netbook computer, a tablet computer, a Personal Communication System (PCS) device, a personal navigation device, a Personal Digital Assistant (PDA), an audio/video player, a digital camera/video, a positioning device, a television receiver, a radio broadcast receiver, an electronic book device, a gaming device or any other combination thereof consisting of accessories and peripherals of these devices or any other combination thereof. It may also be predicted that the computing device 100 can support any type of user-specific interface (such as a "wearable" circuit and the like).

The processing unit 110 may be a physical or virtual processor and can execute various processing based on the programs stored in the memory 120. In a multi-processor system, a plurality of processing units executes computer-executable instructions in parallel to enhance parallel processing capability of the computing device 100. The processing unit 110 also can be known as a central processing unit (CPU), microprocessor, controller or microcontroller.

The computing device 100 usually includes a plurality of computer storage mediums. Such mediums may be any attainable medium accessible by the computing device 100, including, but not limited to, a volatile and non-volatile media, a removable and a non-removable medium. The memory 120 may be a volatile memory (e.g., a register, a cache, a Random Access Memory (RAM)), a non-volatile memory (such as, a Read-Only Memory (ROM), an Electrically Erasable Programmable Read-Only Memory (EEPROM), a flash), or any combination thereof. The storage device 130 may be a removable or non-removable medium, and may include a machine-readable medium such as, a memory, a flash memory, a drive, a disk or any other medium, which may be used for storing information and/or data and be accessed within the computing device 100.

The computing device 100 may further include additional removable/non-removable, volatile/non-volatile storage media. Although not shown in FIG. 1, there may be provided a disk drive for reading from or writing into a removable and non-volatile disk and an optical disc drive for reading from or writing into a removable and non-volatile optical disc. In such cases, each drive may be connected to a bus (not shown) via one or more data medium interfaces.

The communication unit 140 implements communication with another computing device via a communication medium. Additionally, functions of components of the computing device 100 may be realized by a single computing cluster or a plurality of computing machines, and these computing machines may communicate through communication connections. Therefore, the computing device 100 may operate in a networked environment using a logic connection to one or more other servers, a Personal Computer (PC) or a further general network node.

The input device 150 may be one or more various input devices, such as a mouse, a keyboard, a trackball, a voice-input device, and the like. The output device 160 may be one or more output devices, e.g., a display, a loudspeaker, a printer, and so on. The computing device 100 may also communicate through the communication unit 140 with one or more external devices (not shown) as required, where the external device, e.g., a storage device, a display device, and so on, communicates with one or more devices that enable users to interact with the computing device 100, or with any device (such as a network card, a modem, and the like) that enable the computing device 100 to communicate with one or more other computing devices. Such communication may be executed via an Input/Output (I/O) interface (not shown).

In some implementations, apart from being integrated on an individual device, some or all of the respective components of the computing device 100 may also be set in the form of a cloud computing architecture. In the cloud computing architecture, these components may be remotely arranged and may cooperate to implement the functions described by the subject matter described herein. In some implementations, the cloud computing provides computation, software, data access and storage services without informing a terminal user of physical locations or configurations of systems or hardware providing such services. In various implementations, the cloud computing provides services via a Wide Area Network (such as Internet) using a suitable protocol. For example, the cloud computing provider provides, via the Wide Area Network, the applications, which can be accessed through a web browser or any other computing component. Software or components of the cloud computing architecture and corresponding data may be stored on a server at a remote location. The computing resources in the cloud computing environment may be merged or spread at a remote datacenter. The cloud computing infrastructure may provide, via a shared datacenter, the services even though they are shown as a single access point for the user. Therefore, components and functions described herein can be provided using the cloud computing architecture from a service provider at a remote location. Alternatively, components and functions may also be provided from a conventional server, or they may be mounted on a client device directly or in other ways.

The computing device 100 may be used for implementing semantic parsing of the natural language queries in the various implementations of the subject matter described herein. The memory 120 may include one or more modules having one or more program instructions, where the modules may be accessed and operated by the processing unit 110 to realize functions of the various implementations described herein. The memory 120 may include a parsing module 122 for performing the semantic parsing function. The memory 120 also may include a query module 126 for performing the data query function.

While performing the semantic parsing, the computing device 100 can receive a natural language query 170 via the input device 150. The natural language query 170 may be input by users and include sentences based on natural language, for example, including a plurality of words. In the example of FIG. 1, the natural language query 170 is a sentence written in English "Who got the cheapest iPhone 8?" The natural language query 170 may be inputted for querying a specific knowledge base, such as a data table 132 stored in the storage device 130. The data table 132, for example, includes a plurality of data columns and the column names of the data columns are "Customer," "Salesman," "Product," "Price" and "Sales", as well as data items defined by rows and columns, e.g., "Tom," and "Marry" etc., respectively.

The natural language query 170 is inputted into the parsing module 122 of the memory 120. The parsing module 122 may parse the natural language query 170 and generate a computer-executable query 124 for the data table 132, where the computer-executable query 124 is a query which is written in machine language, particularly machine query language. In the example of FIG. 1, the computer-executable query 124 is an SQL-written query "Select Customer where Produce=iPhone8 ORDERBY Price asc LIMIT1."

The computer-executable query 124 may be provided to the query module 126, which can perform the computer-executable query 124 to find out, from the data table 132, the customer who bought the product iPhone8 at the lowest price. A query result 180 is provided to the output device 160 by the query module 126, and is further outputted by the output device 160 as a response to the natural language query 170. In the example of FIG. 1, the query result 180 is presented as a natural language sentence "Tom." Although being illustrated as a natural language sentence in FIG. 1, the query result 180 may also be displayed, based on its specific type and the actual requirements, as numeric values, tables, graphs or in other forms such as audio or video in further implementations. Implementations are not limited in this regard.

It should be understood that the natural language query 170, the computer-executable query 124, the query result 162 and the data table 132 shown in FIG. 1 are only for the purpose of examples, rather than suggesting any limitation on the scope of the implementations of the subject matter described herein in any manner. Although the illustration is made with SQL as the example, the natural language query may be converted into a computer-executable query in any other form of machine language. The data table 132 or other knowledge bases for query may be stored locally in the computing device 100 or in an external storage device or a database accessible via the communication unit 140. In some implementations, the computing device 100 may perform semantic parsing jobs only and provide the parsing results to other devices for generating the computer-executable queries and/or determining the query results. Therefore, the memory 120 of the computing device 100 may not include the query module 126.

Working Principle

In accordance with implementations of the subject matter described herein, there is provided a solution for semantic parsing of natural language queries. In this solution, a natural language query for a data table is received, where the natural language query includes a plurality of words. A set of knowledge representations associated with the data table are obtained, where the set of knowledge representations describe, in a structured manner, the knowledge required for understanding a natural language query for the data table. Based on the set of knowledge representations, the natural language query is converted into a sequence of symbols by replacing the plurality of words with respective symbols in a predetermined symbol table. A computer-executable query corresponding to the natural language query is generated based on the sequence of symbols. According to the present solution, various knowledge representations from different fields can be unified, such that these knowledge representations can be utilized to assist in understanding the semantics of the natural language query and generating respective computer-executable queries.

Figure 2:
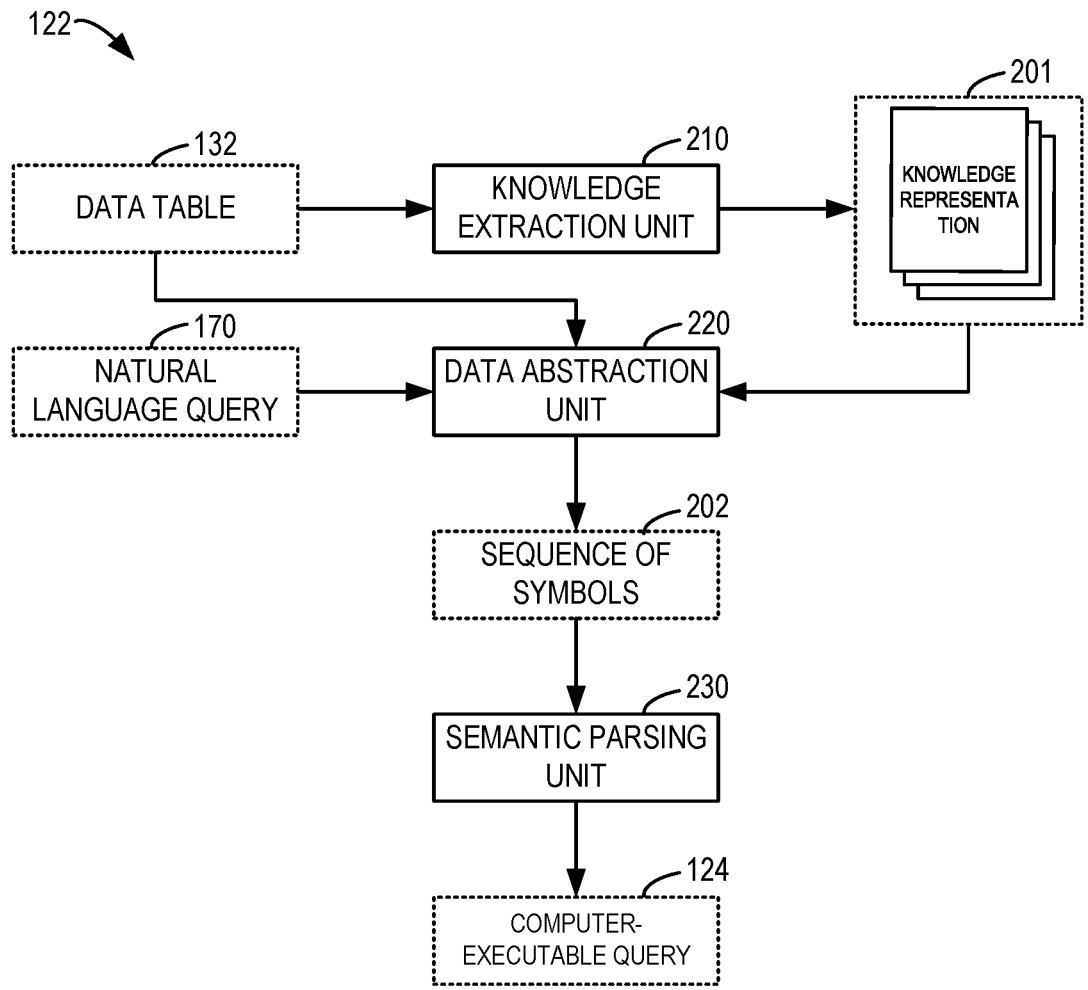
FIG. 2 illustrates a block diagram of a parsing module for semantic parsing of a natural language query in accordance with implementations of the subject matter described herein.

FIG. 2 illustrates a parsing module 122 for parsing a natural language query in accordance with some implementations of the subject matter described herein. The parsing module 122 may be implemented in the computing device 100 of FIG. 1. As shown in FIG. 2, the parsing module 122 may include a knowledge extraction unit 210, a data abstraction unit 220 and a semantic parsing unit 230.

The knowledge extraction unit 210 may extract, from the data table 132 (also known as "the first data table" herein), a set of knowledge representations 201 (also known as "the first set of knowledge representations" herein), where the knowledge representations 201 describe, in a structured manner, the knowledge required for understanding the natural language query for the data table 132. The data abstraction unit 220 may convert the natural language query 170 into a sequence of symbols 202 (also known as "the first sequence of symbols" herein) by replacing, based on the set of knowledge representations 201, a plurality of words in the natural language query 170 with respective symbols in the predetermined symbol table. The semantic parsing unit 230 may generate, based on the sequence of symbols 202, a computer-executable query 124 (also known as "the first computer-executable query" herein) corresponding to the natural language query 170.

It should be understood that the structure and functions of the parsing module 122 in FIG. 2 are demonstrated merely for the purpose of examples and are not intended for limiting the scope of the subject matter described herein. In some implementations, the parsing module 122 may have structures and/or functions different from FIG. 2.

Extraction of Knowledge Representations

The knowledge extraction unit 210 shown in FIG. 2 may extract a set of knowledge representations 201 from the data table 132. The knowledge representations 201 describe, in a structured manner, the knowledge required for understanding the natural language query for the data table 132.

In some implementations, despite the application fields to which the data table 132 is related, each of the knowledge representations 201 may indicate one or more of: the knowledge type described by the knowledge representation, a data column in the data table 132 related to the knowledge representation, at least one word related to the data column and possibly existing in a natural language query; and semantic information indicated by the at least one word. In some implementations, the above information may be recorded in the form of key-value pairs in each knowledge representation.

In some implementations, the knowledge type described by each knowledge representation may generally be divided into: the first knowledge type describing an entity or a column name of a data column in the data table, the second knowledge type describing an attribute of the data column in the data table, and the third knowledge type describing an act related to a data column in the data table. In some implementations, for example, the first knowledge type may further include a person type, a location type, a time type and a unit type (e.g., U.S. dollar), and the like according to the described entity.

In some implementations, the knowledge representation of the second knowledge type generally corresponds to an adjective phrasing in the natural language query. In some implementations, the knowledge representation of the second knowledge type may indicate the knowledge type described by the knowledge representation, the data column in the data table related to the knowledge representation, at least one data column-related adjective which may possibly exist in the natural language query and a modification direction of the at least one adjective. Taking the data column "Price" in the table 132 for example, adjectives such as "cheap" and "low" modify "Price" with a negative direction while adjectives such as "expensive and "high" modify "Price" with a positive direction.

In some implementations, the knowledge representation of the third knowledge type often corresponds to a verb phrasing in the natural language query, such as subject-predicate phrasing, verb-object phrasing, verb-complement phrasing, and the like.

Figure 3A:
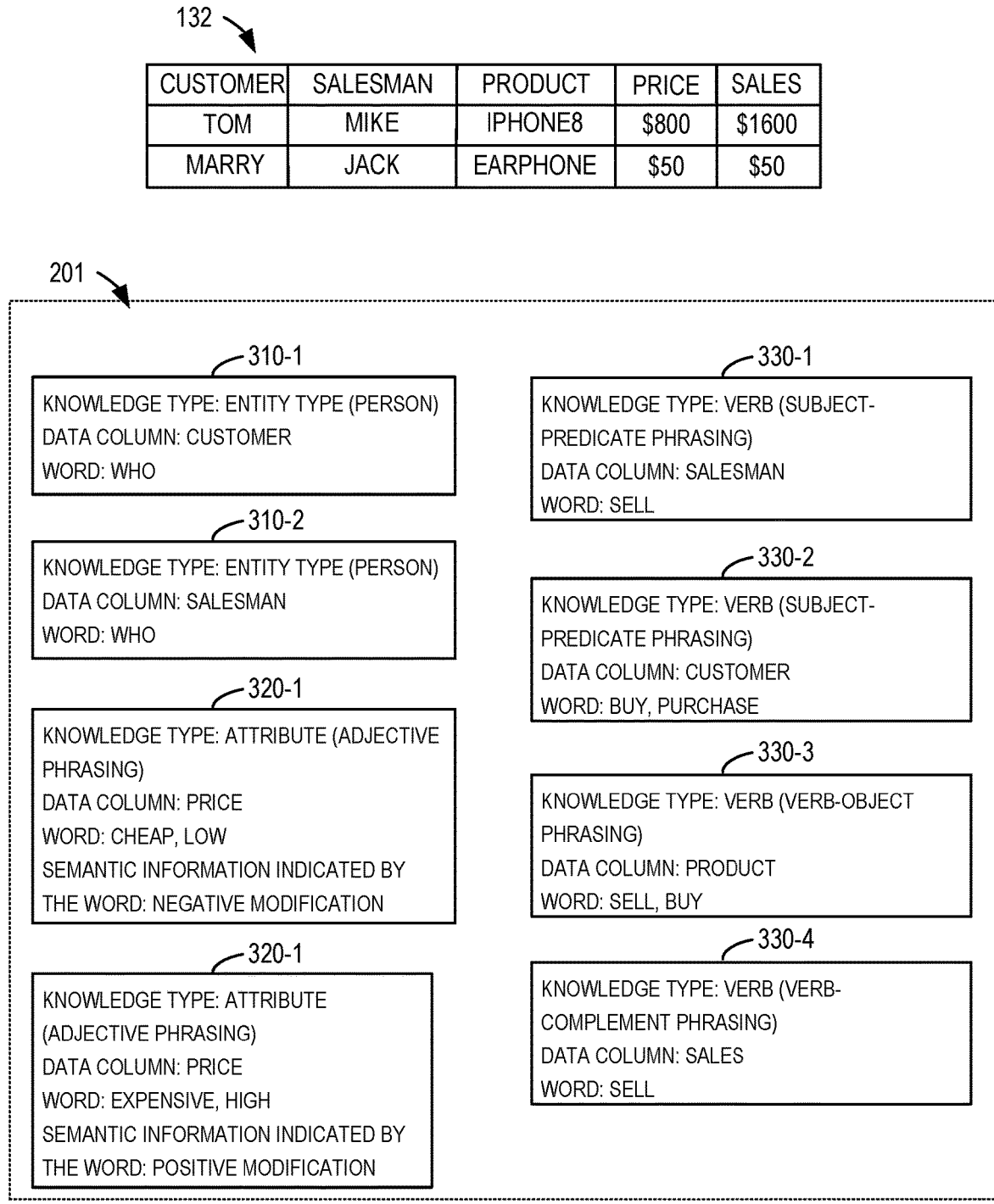
FIG. 3A illustrates a schematic diagram of obtaining knowledge representations associated with a data table in accordance with implementations of the subject matter described herein.

Knowledge representation of each type is further illustrated with examples below with reference to FIG. 3A. FIG. 3A illustrates a schematic diagram of knowledge representations 201 associated with the data table 132 in accordance with implementations of the subject matter described herein. As shown in FIG. 3A, knowledge representations 310-1 and 310-2 of the first knowledge type, knowledge representations 320-1 and 320-3 of the second knowledge type, and knowledge representations 330-1, 330-2, 330-3 and 330-4 of the third knowledge type may be extracted from the data table 132.

The knowledge representation 310-1, for example, is the Person type and involves the data column "Customer" in the data table 132. In natural language queries, words that may possibly refer to the data column "Customer" for example include "who." Similarly, the knowledge representation 310-2 is the Person type and involves the data column "Salesman" in the data table 132 and the word that may possibly refer to the data column "Salesman" in the natural language query, for example, include "who."

For example, the knowledge representation 320-1 is the second knowledge type describing the attribute of the data column "Price" and involves the data column "Price" in the data table 132. In natural language queries, words used for modifying the data column "Price" with a negative direction may include, for example, "cheap," "low," and the like. Similarly, the knowledge representation 320-2, for example, is the second knowledge type describing the attribute of the data column "Price" and involves the data column "Price" in the data table 132. In natural language queries, words used for modifying the data column "Price" with a positive direction may include "expensive," "high," and the like.

For example, the knowledge representation 330-1 is the third knowledge type describing acts related to the data column "Salesman", which involves the data column "Salesman" in the data table 132. In the natural language query, words that may be used for describing the acts related to the data column "Salesman" include "sell." For example, the knowledge representation 330-2 is the third knowledge type describing acts related to the data column "Customer" and involves the data column "Customer" in the data table 132. In natural language queries, words that may be used for describing acts related to the data column "Customer," for example, include "buy," "purchase," and the like. The knowledge representation 330-3, for example, is the third knowledge type describing acts related to the data column "Product" and involves the data column "Product" in the data table 132. In natural language queries, words that may be used for describing acts related to the data column "Product," for example, include "sell," "buy," and the like. Likewise, the knowledge representation 330-4, for example, is the third knowledge type describing acts related to the data column "Sales" and involves the data column "Sales" in the data table 132. In the natural language query, words that may be used for describing acts related to the data column "Sales," for example, include "sell" and the like.

It should be appreciated that rather than suggesting limitation on the scope of the subject matter described herein, respective individual knowledge tables shown in FIG. 3A are illustrated only for the purpose of examples to help those skilled in the art understand how to represent knowledge representations of different fields with universal knowledge frames. In other implementations, more knowledge representations and/or knowledge representations different from those shown in FIG. 3A may be extracted from the data table 132.

In some implementations, the knowledge extraction unit 210 may automatically or semi-automatically or manually generate the knowledge representation 201 shown in FIG. 3A with any currently known or to be developed approaches, including but is not limited to, the heuristic method, neural network-based method, method based on reinforcement learning, crowd-sourcing method, data mining-based method, method based on expertise, method based on human interaction, and so on. The scope of the subject matter described herein is not limited in this regard. In some implementations, the knowledge extraction unit 210 may first generate, based on the data table 132, an ontology graph for describing types and attributes of respective data columns and relationships between different data columns. The knowledge extraction unit 210 may generate, for example, the knowledge representation 201 shown in FIG. 3A based on the ontology graph. The ontology graph may be generated automatically or manually.

Figure 3B:
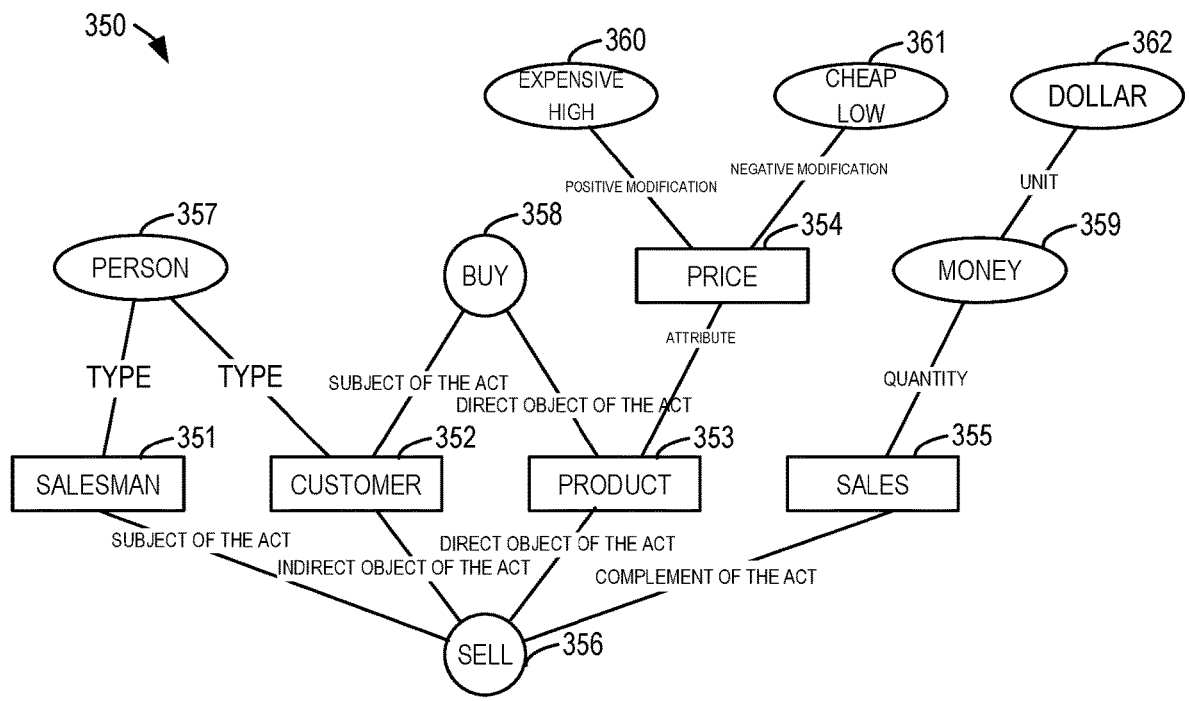
FIG. 3B illustrates an ontology graph corresponding to a data table in accordance with implementations of the subject matter described herein.

FIG. 3B illustrates an example ontology graph 350 corresponding to the data table 132 in accordance with implementations of the subject matter described herein. As shown in FIG. 3B, nodes 351, 352 . . . 355 represented by box respectively correspond to data columns "Salesman," "Customer," "Product," "Price," and "Sales" in the data table 132. Nodes 356 and 358 represent acts related to the data columns, i.e., "Sell" and "Buy", respectively. For example, the data column "Salesman" is the subject of the act "Sell;" the data column "Customer" is the indirect object of the act "Sell;" the data column "Product" is the direct object of the act "Sell;" the data column "Sales" is the complement of the act "Sell." For another example, the data column "Customer" is the subject of the act "Buy" while the data column "Product" is the direct act of the verb "Buy." The type of the data columns "Salesman" and "Customer" is represented by a node 357 and the type is "Person." Moreover, the data column "Price" is the attribute of the data column "Product." The quantity of the data column "Sales" is indicated by a node 359, which represents "Money." The unit of "Money" is "Dollar" and a node 362 represents "Dollar." Words for modifying the data "Price" with a positive direction is represented by a node 360 and include, for example, "expensive," "high," and the like. Words for modifying the data "Price" in the negative direction is represented by a node 361 and include, for example, "cheap," "low," and the like. The knowledge extraction unit 210 may generate the knowledge representations 201 of FIG. 3A based on the ontology graph 350 in FIG. 3B.

Data Abstraction

The data abstraction unit 220 shown in FIG. 2 may convert the natural language query 170 into the sequence of symbols 202 by replacing, based on the set of knowledge representations 201, the plurality of words in the natural language query 170 with respective symbols in a predetermined symbol table. The order of a plurality of predetermined symbols in the sequence of symbols 202 is the same as the order of the respective plurality of words in the natural language query 170. By mapping the original words in the natural language query 170 to limited predetermined symbols in the predetermined symbol table, the difficulty of parsing caused by excessive vocabularies in different natural languages is reduced.

The predetermined symbol table is also known as a "predetermined dictionary." In some implementations, symbols in the predetermined symbol table may include predetermined symbols indicating information or data associated with the data table and predetermined symbols corresponding to knowledge representations of various knowledge types. As other symbols may be deduced from this type of predetermined symbols, the predetermined symbols may also be referred to as "metadata symbols" and may be included in a set of metadata symbols. Some examples of the predetermined symbols in the set of metadata symbols are provided in Table 1 below. It should be understood that symbols of English letter type in Table 1 are examples only and any other symbols are also feasible.

TABLE 1

Set of Metadata Symbols

| Symbol | Attribute | Semantics |
|---|---|---|
| C | Data column; Type | Describing data columns in a data table or entities (such as person, location, time, unit, and so on) |
| V | Value; Data column | Describing the value of general data items in the data table |
| N | Value; Data column | Describing the value of data items indicating numeric values/numeric value ranges in the data table |
| D | Value; Data column | Describing the value of data items indicating date/time in the data table |
| ADJ | Data column; Modification direction | Describing the attribute of data columns in the data table |
| VERB | Data column | Describing acts related to data columns in the data table |

In Table 1, the symbol C may be used for replacing words in the natural language query 170 matching column names of data columns in the data table 132 and words (e.g., "who") indicated by knowledge representations of the first knowledge type (e.g., the knowledge representations 310-1 and 310-2 shown in FIG. 3A). The symbol C includes attributes "data column" (represented as col, e.g., C.col) and "type" (represented as type, e.g., C.type), where the attribute "data column" records column names of the data columns in the data table 132 related to the symbol C and the attribute "type" may refer to types of the data in the data column, such as character string, numeric value, date, and the like; or the types included in the first knowledge type, e.g., person, location, time, and unit.

The symbol V is used for replacing a word in the natural language query 170 matching the value of a general data item in the data table 132. The symbol N is used for replacing a word in the natural language query 170 matching the value of a data item indicating numeric value/numeric value range in the data table 132. The symbol D is used for replacing a word in the natural language query 170 matching the value of a data item indicating date/time in the data table 132. Symbols V, N and D all include attributes "value" (denoted as value) and "data column" (indicated as col), where the attribute "value" records values of data items defined by rows and columns and the attribute "data column" indicates the data columns where the data items are located.

The symbol ADJ is used for replacing the words (e.g., "cheap," "low," "high," and the like) and their comparative form and superlative form in the natural language query 170 indicated by the knowledge representations of the second knowledge type (e.g., the knowledge representations 320-1 and 320-2 shown in FIG. 3A). The symbol ADJ is of attributes "data column" (represented as col) and "modification direction" (represented as direction). The attribute "data column" records column names of the data columns modified by the adjective in the data table 132 and the attribute "modification direction" may indicate positive modification (represented as "+") or negative modification (represented as "−").

The symbol VERB is used to replace words (e.g., "buy," "sell," "purchase," and so on) in the natural language query 170 indicated by the knowledge representations of the third knowledge type (e.g., the knowledge representations 330-1 and 330-2 in FIG. 3A). The symbol VERB is of the attribute "data column" (indicated as col) for recording column names of data columns in the data table 132 to which the act (verb) is directed.

Besides the metadata symbols shown in Table 1, symbols in predetermined dictionaries may also include symbols indicating particular words in natural language queries. The particular words may include, but is not limited to: important stop words in English, for example, "by," "of," "with," and the like; words associated with data operation and/or data aggregation in English, such as "group," "sort," "different," "sum," "average," "count," and the like; comparison-related words in English, such as "greater," "than," "less," "between," "most," and the like; and/or articles "a," "an," "the," and the like. Such particular words may not be replaced during data abstraction. Alternatively, these particular words may also be replaced by unified symbols different from the metadata symbols, such as "PAT." In some implementations, a special symbol may also be configured for replacing unknown words and this special symbol may be any symbol distinguished from other predetermined symbols, such as "UNK." It can be seen that predetermined symbols in the predetermined symbol table are not specific to a given data table or a given field and instead are universal to all data tables or all fields.

During data abstraction, a plurality of technologies may be adopted to match one or more words in the natural language query 170 with predetermined symbols. In some implementations, the data abstraction unit 220 segments (i.e., word segmentation) a plurality of words in the natural language query 170 and/or transforms the word form to obtain a plurality of sets of words, where each set includes one or more words. Alternatively, in some implementations, word segmentation may not be performed and a plurality of words are directly partitioned one by one instead. Afterwards, the data abstraction unit 220 may transverse each set of words or each word in the natural language query 170 to determine predetermined symbols for replacing a respective set of words or respective words based on the semantics of the symbols in the predetermined symbol table.

Figure 4:
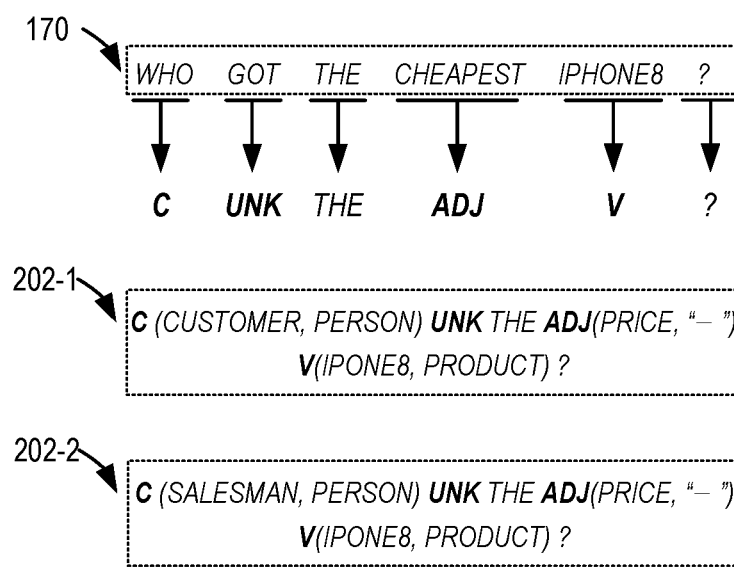
FIG. 4 illustrates a schematic diagram of converting a natural language query into a sequence of symbols in accordance with implementations of the subject matter described herein.

FIG. 4 illustrates a schematic diagram of converting the natural language query 170 into one or more sequences of symbols 202 in accordance with implementations of the subject matter described herein. The natural language query 170 shown in FIG. 4 is as the specific natural language query sentence provided in FIG. 1. As shown in FIG. 4, the data abstraction unit 220 may determine that the word "Who" matches the words indicated by the knowledge representations 310-1 and 310-2 of the first knowledge type shown in FIG. 3A and accordingly replaces the word with the symbol "C." As the word "got" neither matches the metadata symbols in Table 1 nor belongs to the above described particular words, the data abstraction unit 220 replaces this word with the symbol "UNK." The word "the" belongs to the above described particular words and thus may not be replaced. The word "cheapest" matches the word "cheap" indicated by the knowledge representation 320-1 of the second knowledge type shown in FIG. 3A and is therefore replaced with the symbol "ADJ" by the data abstraction unit 220. The word "iphone8" matches a value of the general data items in the data table 132 and thus the data abstraction unit 220 replaces the word with the symbol "V." Besides, the data abstraction unit 220 may not replace the punctuation mark in the natural data query 170. In this way, the data abstraction unit 220 may convert the natural language query 170 into a sequence of symbols 202 "C UNK THE ADJ V?"

During data abstraction, the data abstraction unit 220 may identify a plurality of matching results for the words in the natural language query 170. For example, the word "who" may either match the knowledge representation 310-1 of the first knowledge type shown in FIG. 3A to indicate the column name "Customer" of the data column, or match the knowledge representation 310-2 of the first knowledge type shown in FIG. 3A to indicate the column name "Salesman" of the data column. In some implementations, each metadata symbol (e.g., the symbols shown in FIG. 1) in the predetermined symbol table may have corresponding attributes. The data abstraction unit 220 may generate one or more sequence of symbols with attribute information to represent all possible matches.

FIG. 4 demonstrates two types of sequences of symbols 202-1 and 202-2, both of which corresponds to the sequence of symbols "C UNK THE ADJ V?" but includes different symbol attribute information. For example, in the sequence of symbols 202-1, the attribute information of the symbol C indicates the column name of the related data column as "Customer" and the type of the corresponding knowledge representation as "Person;" the attribute information of the symbol ADJ indicates the column name of the related data column as "Price" and the modification direction as "−" (meaning negative modification); the attribute information of the symbol V represents the column name of the related data column as "Price" and the value of the specific data item as "iphone8." In the sequence of symbols 202-2, which is different from the sequence of symbols 202-1, the attribute information of the symbol C indicates the column name of the related data column as "Salesman" and the type of the corresponding knowledge representation as "Person."

With the aid of data abstraction, information associated with the data table, words corresponding to the knowledge representations and particular words in the natural language query 170 may be extracted and unknown words not existing in the predetermined dictionary may be replaced with special predetermined symbols (UNK). In this way, the natural language query having more possible vocabularies is confined in a limited predetermined table, such that the subsequent semantic parsing may be performed rapidly independent of particular fields and data tables.

Semantic Parsing Based on Sequence of Symbols

The semantic parsing unit 230 in FIG. 2 may generate, based on the sequence of symbols 202, a computer-executable query 124 corresponding to the natural language query 170. The semantic parsing unit 230 may convert, with a semantic parser, the sequence of symbols 202 into the computer-executable query 124 corresponding to the natural language query 170, where the semantic parser includes, but is not limited to, a rule-based semantic parser or a neural network-based semantic parser.

In some implementations, the semantic parsing unit 230 may convert the sequence of symbols 202 into a plurality of logic representations by applying a set of deductive rules to the sequence of symbols 202, where each logic representation corresponds to a predicted semantic meaning of the natural language query 170. The semantic parsing unit 230 may select, from the plurality of logic representations, a logic representation that best matches the true semantics of the natural language query 170 and then generate the computer-executable query 124 based on the selected logic representation.

In order to generate logic representations and further promote semantic parsing, the semantic parsing unit 230 may apply different deductive rules to the sequence of symbols 202. Each of the deductive rules defines a symbol transformation rule, which indicates how a further symbol (also known as a "deduced symbol" herein) is deduced from a current symbol. "Deduced symbol" herein refers to a symbol deduced from a predefined symbol in the sequence of symbols. The deduced symbol may be selected from the set of metadata symbols (e.g., those provided in Table 1) and a further set of operating symbols according to specific deductive rules. The set of operating symbols includes one or more operating symbols, which may be mapped to respective data analysis operations. The data analysis operations are both computer-interpretable and computer-executable. The object of data analysis operations is usually the data columns in the data table 132. In this way, each operating symbol may have an attribute "col" to indicate the data column for which the corresponding data analysis operation is targeted. An example of a set of operating symbols is shown in Table 2. It should be understood that the set of operating symbols may include more, less or different operating symbols in other implementations.

TABLE 2

Set of Operating Symbols

| Symbol | Attribute | Data Analysis Operation |
| --- | --- | --- |
| A | Data column | Aggregation |
| G | Data column | Grouping |
| F | Data column | Filtering |
| S | Data column | Finding Extreme Value |

The semantic meaning of symbol A corresponds to aggregation operations and its attribute "data column (represented as A.col)" is used for recording one or more columns to be aggregated. The semantic meaning of symbol G corresponds to grouping operations and its attribute "column" is used for recording one or more columns to be grouped. The semantic meaning of symbol F corresponds to filtering operations and its attribute "column" is used for recording columns to which the filtering operations are applied. The semantic meaning of symbol S corresponds to finding extreme value operations and its attribute "column" is used for recording the columns to which finding the extreme value operations (taking the maximum, minimum, and the like) are applied.

When the deductive rule is applied, a further predetermined symbol may be deduced from the one or more predetermined symbols in the sequence of symbols 202. Besides symbol transformation, each deductive rule may also define application conditions, which specify conditions under which the predetermined symbol can be applied to the deductive rule. By applying the deductive rule, the deduced symbols obtained from the predetermined symbols may be mapped to operations or representations in a data analysis domain, which facilitates subsequently generated logic representations to characterize certain semantics of the natural language query, where the semantics are computer-interpretable (e.g., interpreted by predicate logic).

Before elaborating on how the semantic parsing unit 230 generates a plurality of logic representations corresponding to the sequence of symbols 202, examples of some deductive rules are discussed first. It should be appreciated that the specific deductive rules in discussion are for the purpose of illustration only, rather than limiting the scope of the subject matter described herein.

In some implementations, for the plurality of predetermined symbols composing the sequence of symbols, the deductive rule is applied only to the predetermined symbols from the set of metadata symbols (e.g., Table 1) because these symbols indicate information associated with the data table and/or indicate corresponding knowledge representations. In some implementations, the deduction may be continued on the basis of the previous one (as long as the application conditions are satisfied). Therefore, the deductive rule may also be applied to predetermined symbols from the set of operating symbols.

In some implementations, the deductive rule may be divided into two categories. The deductive rule of a first category is known as synthesis deductive rule, which defines synthesis of two predetermined symbols into one deduced symbol. According to the setting of the rule, the deduced symbol may be manifested in a form identical to either of the two predetermined symbols or neither of them. The synthesis deductive rule is crucial because it can reflect the combinative characteristics of the semantics.

Some examples of the synthesis deductive rule are provided below in Table 3.

TABLE 3

Examples of Synthesis Deductive Rule

| Deduction and Predicate Logic | Application Condition | Rule of Attribute |
| --- | --- | --- |
| C\|A\|G\|S + T → T̂:[project] | (C\|A\|G\|S).col ⊆ T.col | T̂.col = (C\|A\|G\|S).col |
| F + T → T̂:[filter] | F.col ⊆ T.col | T̂.col = T.col |
| A\|G + C → Ĝ:[group] | C.type ⊆ {String, date} | Ĝ.col = (A\|G).col ∪ C.col |
| C + V\|D → F̂:[equal] | C.col = (V\|D).col | F̂.col = C.col |
| C + N → F̂:[more\|less\|≥\|≤] | C.col = N.col | F̂.col = C.col |
| F + F → F̂:[and\|or] | N/A | F̂.col = F.col ∪ F.col |
| A + C → Ŝ:[argmax\|argmin] | C.type ∈ {String, date} | Ŝ.col = A.col ∪ C.col |
| $C_1 + C_2$ → Ŝ:[argmax\|argmin] | $C_1$.type ∈ {String, date} $C_2$.type = numeric value | Ŝ.col = $C_1$.col ∪ $C_2$.col |
| C + C → Ĉ:[combine] | N/A | Ĉ.col = C.col ∪ C.col |
| A + A → Â:[combine] | N/A | Â.col = A.col ∪ A.col |
| C\|A\|G\|S + F → Ĉ\|Â\|Ĝ\|Ŝ:[modify] | (C\|A\|G\|S).col ∩ F.col = ∅ | (Ĉ\|Â\|Ĝ\|Ŝ).col = (C\|A\|G\|S).col |

In Table 3, the identification "|" indicates an "OR" relation between the symbols at left and right sides of the identification, i.e., alternative. The deduced symbols are particularly marked with a superscript "^" in each deductive rule. Although the attributes of the deduced symbols are specially configured, the deduced symbols may still be considered as predetermined symbols in the set of metadata or the set of operating symbols. The deduced symbol sometimes is not denoted with a special superscript in the context. It should also be noted that the order of symbols at left and right sides of "+" does not affect the use of the deductive rule. For example, "C+T" is the same as "T+C."

In Table 3, the first column "Deduction and Predicate Logic" indicates the predetermined symbols and their corresponding predicate logic at the right side can be deduced from the two predetermined symbols at the left side. The symbol transformation/deductive rules are mainly originated from relational algebra and the predicate logic is mapped to operations in the data analysis field. Table 3 lists the predicate logic, such as project, filter, equal, more, less, and/or, argmax/argmin, or combine. The second column "Application Condition" indicates the circumstance under which the deductive rules may be applied. The application condition may be set based on expertise. Excessive redundant usage resulting from random arrangements of the deductive rules can be avoided by setting the application condition, such that the search space is greatly reduced. For example, regarding the deduction and predicate logic "G+C→Ĝ:[group]," the symbols "G" and "C" are synthesized into the deduced symbol "Ĝ" only when the attribute (i.e., type) of the predetermined symbol "C" belongs to the character string or the date as defined by the application condition.

The third column "Rule of Attribute" indicates how an attribute of the deduced symbol is configured. When the parsing is performed with a deductive rule, the setting for the attribute of the deduced symbol may be used for subsequent deductions and the generation of a computer-executable query. For example, the rule of the attribute "T̂.col= (C|A|G|S).col" means that the attribute "column" of the deduced symbol T̂ is set to be the recorded column name of the attribute "column" of the predetermined symbols C, A, G or S.

Furthermore, modifying operation, which is based on X-bar theory of selection grammar in the semantic parsing field, is also introduced into the synthesis deductive rule. According to the theory, certain words with some modifiers in a phrase may be considered as keywords. While designing synthesis deductive rules suitable for data query scenarios, the inventor discovered that some predetermined symbols, such as F and S, may be synthesized into one of the predetermined symbols, i.e., the symbol in the previous two predetermined symbols expressing the core semantics (e.g., C|A|G|S+F→Ĉ|Â|Ĝ|Ŝ:[modify]). The synthesized deduced symbol carries on the attribute of the previous predetermined symbol, but the predicate of the modifying operation (modify) is assigned to the deduced symbol. This synthesis deductive rule is conducive to correctly parse core-modifier structures in semantics. Although Table 3 only illustrates some deductive rules related to the modifying operations, more other deductive rules may also be involved as required.

In some implementations, the deductive rule for one-to-one symbol deduction may also be defined and is also referred to as "advanced deductive rule." The advanced deductive rule involves deducing a further predetermined symbol indicating related information of the data table from the predetermined symbol indicating related information of the data table. Furthermore, when the advanced deductive rule is formulated, the application conditions of deductive rules are designed to avoid advanced grammar loop (e.g., two predetermined symbols may constantly interchange with each other). The number of the follow-up generated logic representations can be effectively reduced by suppressing the advanced grammar loop.

Some examples of the advanced deductive rule are shown in Table 4. For example, the deductive rule of "C→Â: [min|max|sum|avg]" allows deducing the symbol Â from the symbol C on the condition that the type attribute corresponding to the symbol C is a numeric value (i.e., C.type=num). The deduced symbol A is mapped to a predicate logic, which may include various predicate logics associated with the numeric value, such as min, max, sum and average. Other deductive rules in Table 4 are also reasonable.

TABLE 4

Examples of Advanced Deductive Rule

| Deduction and Predicate Logic | Application Condition | Rule of Attribute |
|---|---|---|
| C → Â:[min\|max\|sum\|avg] | C.type ∈ numeric value | Â.col = C.col |
| C → Â:[count] | C.type ∈ {string, date} | Â.col = C.col |
| V\|D → F:[equal] | N/A | F̂.col = (V\|D).col |

In some implementations, besides the above synthesis deductive rules and the advanced deductive rules, additional deductive rules may also be defined for respective symbols in the sequence of symbols corresponding to the knowledge representations and the combinations thereof. The additional deductive rule refers to deducing a further predetermined symbol indicating information associated with the data table from predetermined symbols corresponding to knowledge representations. Some examples of the advanced deductive rule are shown in Table 5. For example, the deductive rule defining "C+VERB→Ĉ:[modify]" allows deducing the symbol Ĉ from the symbol C corresponding to the knowledge representations of the first knowledge type on the condition that the type attribute corresponding to the symbol C is one of a person, a location and time (i.e., C.type=person|location|time). The deductive rule defining "C→Ĉ:[modify]" allows deducing the symbol Ĉ from the symbol C corresponding to the knowledge representations of the first knowledge type on the condition that the type attribute corresponding to the symbol C is one of a person, a location, time and a unit (i.e., C.type=person|location|time|unit).

TABLE 5

Examples of Deductive Rules for Knowledge Representations

| Deduction and Predicate Logic | Application Condition | Rule of Attribute |
|---|---|---|
| C + VERB → Ĉ:[modify] | C.type ∈ {person, location, time} | Ĉ.col = C.col |
| C → Ĉ:[modify] | C.type ∈ {person, location, time, unit} | Ĉ.col = C.col |

Examples of different deductive rules have been discussed above. It should be understood that more, less or different deductive rules can be set based on the expertise and the detailed data query scenarios.

In some implementations, the semantic parsing unit 230 may perform semantic parsing from the bottom to the top to parse from the sequence of symbols 202 a plurality of semantic parsing trees as a plurality of logic representations.

The semantic parsing unit 230 may generate logic representations using various semantic parsing techniques. Nodes of each semantic parsing tree include deduced symbols obtained by applying corresponding sets of deductive rules and/or predicate logic corresponding to the deduced symbols. In some implementations, nodes of each semantic parsing tree may also include obtaining a symbol sequence portion corresponding to the deduced symbol, i.e., the symbol sequence portion to which the deduced symbol is mapped. Each semantic parsing tree may be regarded as one predicted semantic meaning corresponding to the natural language query 170.

In some implementations, for each sequence of symbols 202, a bottom-up semantic parsing may start from a plurality of predetermined symbols included therein and the deduced symbols are obtained from applying a give deductive rule when its application condition is satisfied until a final deduced symbol is obtained as an apex of the semantic parsing tree. For example, the bottom-up semantic parsing may be performed on the sequence of symbols 202 using the CKY algorithm. The CKY algorithm may be used to implement a dynamic planning and the deduction process can be expedited. In addition, any other algorithms which can support the bottom-up semantic parsing on the basis of a given rule may also be adopted. Implementations of the subject matter described herein are not limited in this regard.

In the process of generating the semantic parsing tree, when the application conditions of a plurality of deductive rules are met, the semantic parsing unit 230 makes different choices to obtain different semantic parsing trees. The semantic parsing unit 230 basically searches all possible logic representations defined by the deductive rules. In this way, all possible semantics of the natural language query 170 can be predicted. The number of possible predetermined symbols is limited in the sequence of symbols and different deductive rules are triggered under a given circumstance, rather than unconditionally. Accordingly, in the implementations of the subject matter described herein, the search space of the semantic parsing tree is limited, which can enhance the generation of logic representations and boost the efficiency of the subsequent operations. Meanwhile, the predetermined symbols and the deductive rules are designed to ensure flexibility and expressivity on the grammatical level, so as to maintain accuracy of the semantic parsing.

Figure 5:
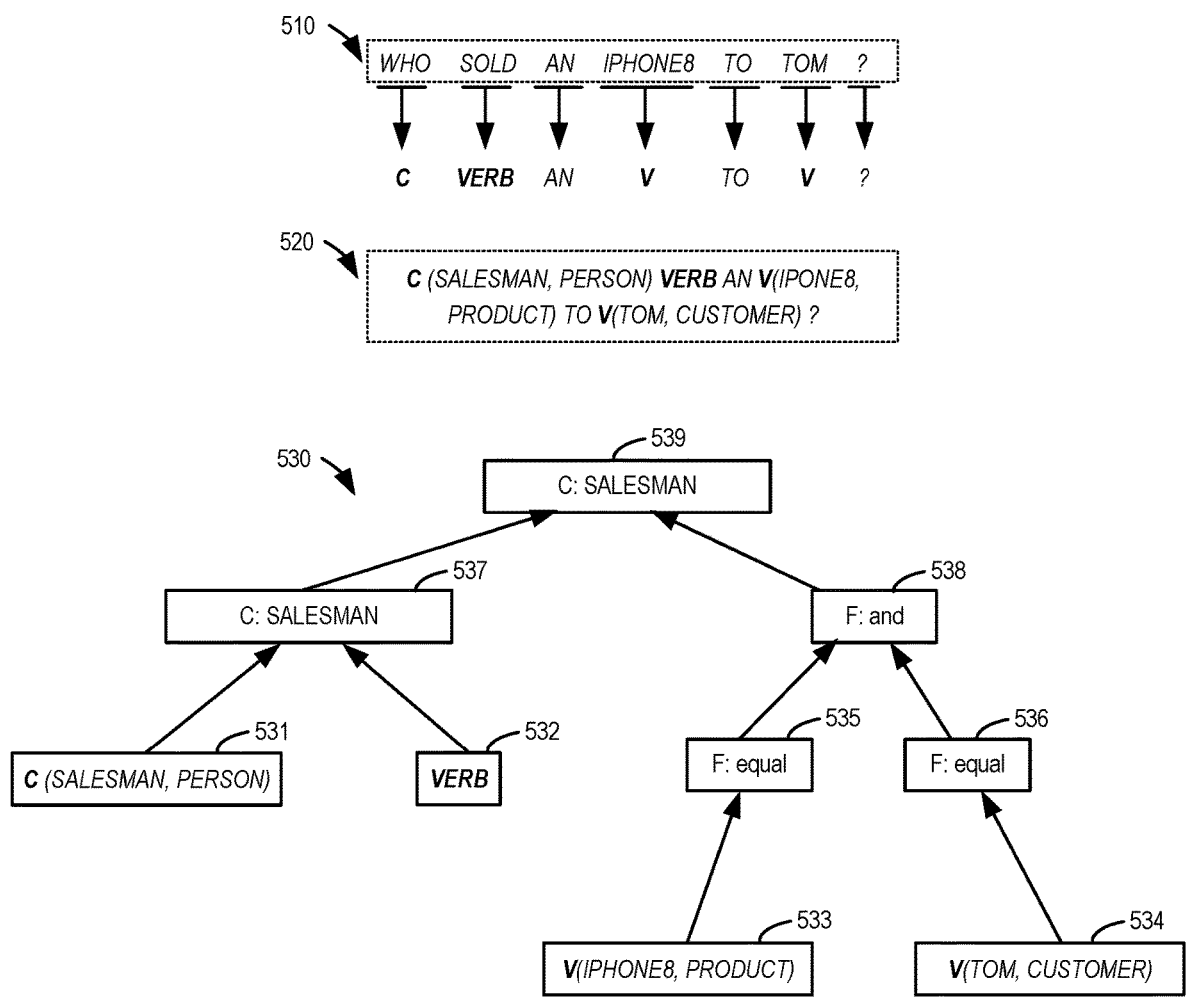
FIG. 5 illustrates a schematic diagram of generating a logic representation corresponding to the sequence of symbols in accordance with implementations of the subject matter described herein.

FIG. 5 illustrates a schematic diagram of generating logic representations corresponding to a sequence of symbols in accordance with implementations of the subject matter described herein. FIG. 5 demonstrates a natural language query 510 "Who sold an iPhone8 to Tom?" for the data table 132. The data abstraction unit 220 shown in FIG. 2, for example, converts the natural language query 510 into a sequence of symbols 520 "C(Salesman, Person) VERB AN V(iPhone8, Product) TO V(Tom, Customer)?"

The semantic parsing unit 230 may generate leaf nodes 531, 532, 533 and 534 of the semantic parsing tree 530 based on the symbols C(Salesman, Person), VERB, V(iPhone8, Product) and V(Tom, Customer) in the sequence of symbols 520. The semantic parsing unit 230 may determine that the combination of symbol C(Salesman, Person) and symbol VERB complies with the application condition of the deductive rule "C+VERB→Ĉ:[modify]" shown in Table 5 and accordingly generates a parent node 537 of the leaf nodes 531 and 532 by applying the deductive rule, the parent node representing the deduced symbol C: Salesman. The semantic parsing unit 230 may determine that the symbol V(iPhone8, Product) and symbol V(Tom, Customer) respectively complies with the application condition of the deductive rule "V|D→F̂:[equal]" shown in Table 4 and accordingly generates a parent node 535 of the leaf node 533 and a parent node 536 of the leaf node 534 by applying the deductive rule, the nodes 535 and 536 respectively representing the deduced symbol F:equal. The semantic parsing unit 230 may further apply the deductive rule "F+F→F̂:[and|or]" shown in Table 3 to generate a parent node 538 of the nodes 535 and 536, the node 538 for example representing the deduced symbol F:and. The semantic parsing unit 230 may further apply the deductive rule "C|A|G|S+F→Ĉ|Â|Ĝ|Ŝ:[modify]" shown in Table 3 to generate a parent node 539 of the nodes 537 and 538, the node 539 for example representing the deduced symbol C: Salesman.

It should be understood that the logic representation 530 in the form of a semantic parsing tree shown by FIG. 5 is just an example without suggesting that only a unique logic representation can be generated for each sequence of symbols. In some implementations, the semantic parsing unit 230 may generate a plurality of logic representations for the sequence of symbols 202, where each logic representation corresponds to a predicted semantic meaning of the natural language query 170. The semantic parsing unit 230 may select from a plurality of logic representations a logic representation that best matches the true semantics of the natural language query 170 and generate the computer-executable query 124 on the basis of the selected logic representation.

In some implementations, the semantic parsing unit 230 may select, from a plurality of logic representations, a logic representation that best matches the true semantics of the natural language query 170 using a trained neural network. The neural network is usually built to include a plurality of neurons and each neuron processes the input according to training-derived parameters and generates an output. Parameters of all neurons in the neural network form a set of parameters. When the set of parameters of the neural network is determined, the neural network may be operated to perform corresponding functions. In the text, the neural network may also be known as "model," "learning network," "neural network model" or "network."

In some implementations, the neural network utilized by the semantic parsing unit 230 may be trained to determine the semantic confidence of a predicted semantic meaning corresponding to each of a plurality of logic representations, where the semantic confidence, for example, may indicate a probability of the logic representation reflecting the true semantics of the natural language query 170. The semantic parsing unit 230 may select, based on corresponding semantic confidence of the plurality of logic representations, a logic representation associated with the highest semantic confidence, and generate the computer-executable query 124 based on the selected logic representation. Because the logic representation is a computer-interpretable expression form (e.g., the semantic parsing tree 530 shown in FIG. 5), a computer can easily convert the logic representation into a computer-executable query written in machine query language (such as SQL query). For example, the computer-executable query generated for the semantic parsing tree 530 shown in FIG. 5 may be "Select Salesman where Customer=Tom and Product=iPhone8." It should be appreciated that the computer-executable query may be generated using any currently known or to be developed methods and the scope of the subject matter described herein is not limited in this regard.

Alternatively, in some implementations, the neural network may also be trained to directly generate, based on the sequence of symbols, the computer-executable query 124 reflecting the true semantics of the natural language query 170. In other words, by directly utilizing the neural network, the semantic parsing unit 230 shown in FIG. 2 may generate, based on the sequence of symbols 202, the computer-executable query 124 corresponding to the natural language query 170.

Model Training

Figure 6:
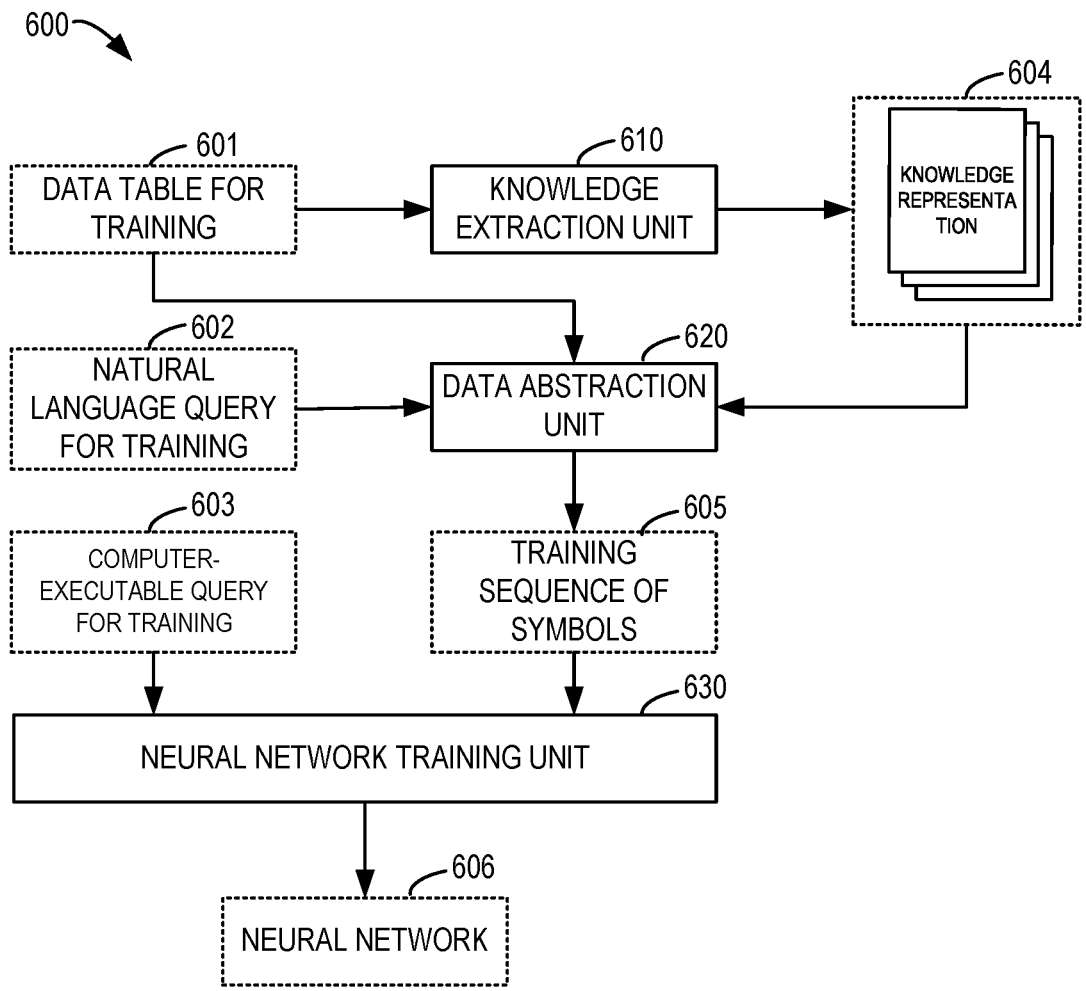
FIG. 6 illustrates a block diagram of a system for training a neural network in accordance with implementations of the subject matter described herein.

FIG. 6 illustrates a block diagram of a system 600 for training a neural network in accordance with implementations of the subject matter described herein. The system may be provided for training the neural network to be used by the semantic parsing unit 230. For example, the system 600 may be used for training the neural network which can determine corresponding semantic confidence of the plurality of logic representations, or for training the neural network which can directly generate a corresponding computer-executable query based on the sequence of symbols.

As shown in FIG. 6, the system 600 generally may include a knowledge extraction unit 610, a data abstraction unit 620 and a neural network training unit 630. The input of the system 600 may include a data table 601 for training (also known as "the second data table" herein), a natural language query 602 (also known as "the second natural language query" herein) for the data table 601 and a computer-executable query 603 (also known as "the second computer-executable query" herein) matching the natural language query 602. The second data table 601 may be identical to or different from the first data table 132. In addition, the fields involved in the second data table 601 may also be identical to or different from those involved in the first data table 132.

The knowledge extraction unit 610 may extract, from the second data table 601, a set of knowledge representations 604 (also known as "the second set of knowledge representations" herein). The knowledge extraction unit 610 may be implemented in the same way as the knowledge extraction unit 210 shown in FIG. 2 and will not be repeated herein. The data abstraction unit 620 may convert, based on the second set of knowledge representations 604, the natural language query 602 for the data table 601 into a sequence of symbols 605 for training (also known as "the second sequence of symbols" herein). The data abstraction unit 620 may be implemented in the same way as the knowledge extraction unit 210 shown in FIG. 2 and will not be repeated herein.

The second computer-executable query 603 and the second sequence of symbols 605 may be provided to the neural network training unit 630, which may generate, at least based on the second computer-executable query 603 and the second sequence of symbols 605, training data for training the neural network 606. It should be understood that the neural network training unit 630 may adopt any currently known or to be developed methods to train the neural network 606 and the scope of the subject matter described herein is not limited in this regard. The trained neural network 606 may be provided to the parsing module 122 (the semantic parsing unit 230 therein) shown in FIG. 2. The semantic parsing unit 230, for example, may perform the semantic parsing on the sequence of symbols 202 with the neural network 606 and generate the computer-executable query 124.

From the above description, implementations of the subject matter described herein provide a solution for semantic parsing of the natural language queries. According to this solution, all kinds of knowledge from different fields with universal structured knowledge representations (also known as "knowledge frame") can be represented. By expressing the knowledge with the universal knowledge frame, when the model for semantic parsing of the natural language queries is trained, it is only required to understand the true semantics of the natural language queries with the aid of the universal knowledge frame. In face of natural language queries in new fields, the background knowledge from the new fields may be represented as universal knowledge frame. Since the model for parsing the natural language queries is trained based on the universal knowledge frame, the model, without being re-trained, can directly parse the natural language queries in the new fields based on the universal knowledge frame from the new fields.

Example Process

Figure 7:
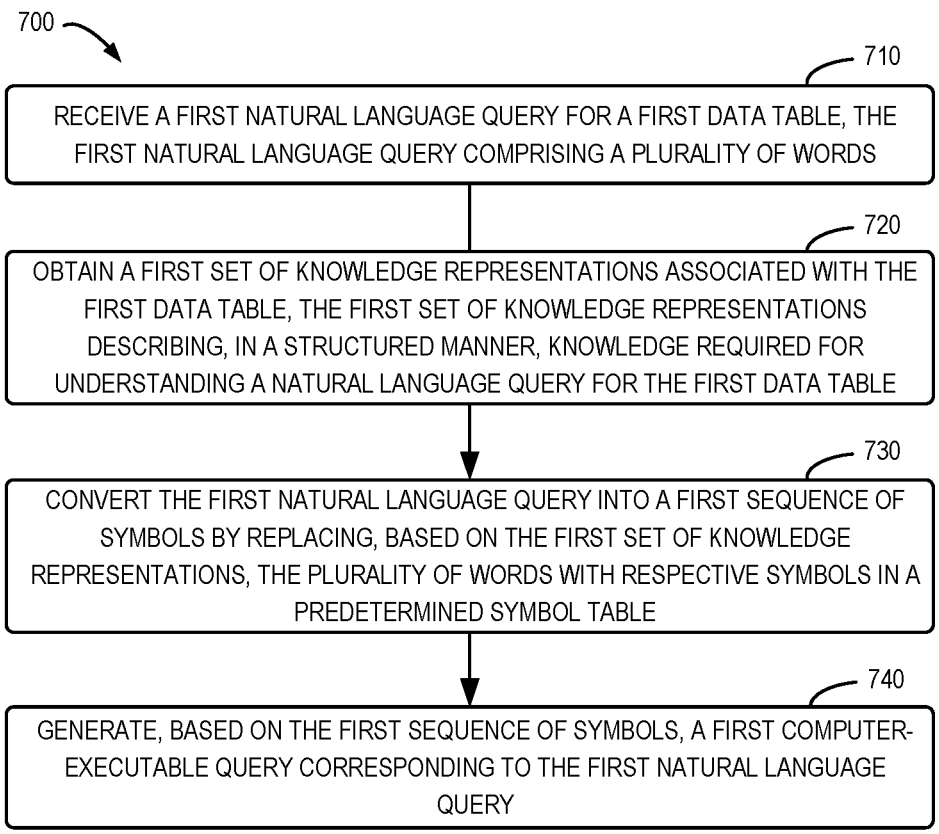
FIG. 7 illustrates a flow chart of a method for parsing natural language queries in accordance with implementations of the subject matter described herein.

FIG. 7 illustrates a flowchart of a method 700 for semantic parsing of a natural language query in accordance with some implementations of the subject matter described herein. The method 700 may be implemented by the computing device 100, for example, at the parsing module 122 in the memory 120 of the computing device 100. At block 710, the computing device 100 receives a first language query for a first table, the first language query including a plurality of words. At block 720, the computing device 100 obtains a first set of knowledge representations associated with the first data table, the first set of knowledge representations describing, in a structured manner, knowledge required for understanding a natural language query for the first data table. At block 730, the computing device 100 converts the first natural language query into a first sequence of symbols by replacing, based on the first set of knowledge representations, the plurality of words with respective symbols in a predetermined symbol table. At block 740, the computing device 100 generates, based on the first sequence of symbols, a first computer-executable query corresponding to the first natural language query.

In some implementations, a knowledge representation in the first set of knowledge representations indicates at least one of the following: a knowledge type described by the knowledge representation, a data column in the first data table related to the knowledge representation, at least one word related to the data column and possibly existing in a natural language query, and semantic information indicated by the at least one word.

In some implementations, the knowledge type described by the knowledge representation comprises one of the following: a first knowledge type describing an entity or a column name of a data column in the first data table, a second knowledge type describing an attribute of a data column in the first data table, and a third knowledge type describing an act related to a data column in the first data table.

In some implementations, the first set of knowledge representations comprises a first knowledge representation of the first knowledge type and the predetermined symbol table comprises a first predetermined symbol corresponding to the first knowledge type, and wherein the replacing the plurality of words with respective symbols in a predetermined symbol table comprises: in response to determining that a first word of the plurality of words matches a column name of a data column in the first data table or matches the at least one word indicated by the first knowledge representation, replacing the first word with the first predetermined symbol.

In some implementations, the first set of knowledge representations comprises a second knowledge representation of the second knowledge type and the predetermined symbol table comprises a second predetermined symbol corresponding to the second knowledge type, and wherein the replacing the plurality of words with respective symbols in a predetermined symbol table comprises: in response to determining that a second word of the plurality of words matches the at least one word indicated by the second knowledge representation, replacing the second word with the second predetermined symbol.

In some implementations, the first set of knowledge representations comprises a third knowledge representation of the third knowledge type and the predetermined symbol table comprises a third predetermined symbol corresponding to the third knowledge type, and wherein the replacing the plurality of words with respective symbols in a predetermined symbol table comprises: in response to determining that a third word of the plurality of words matches the at least one word indicated by the third knowledge representation, replacing the third word with the third predetermined symbol.

In some implementations, the replacing the plurality of words with respective symbols in a predetermined symbol table comprises: in response to determining that a fourth word of the plurality of symbols matches a fourth predetermined symbol in the predetermined symbol table, replacing the fourth word with the fourth predetermined symbol.

In some implementations, the generating a first computer-executable query comprises: converting the first sequence of symbols into a plurality of logic representations by applying a set of deductive rules to the first sequence of symbols, each logic representation corresponding to a predicted semantic meaning of the first natural language query; selecting, from the plurality of logic representations, a logic representation that best matches true semantics of the first natural language query; and generating the first computer-executable query based on the selected logic representation.

In some implementations, the selecting a logic representation comprises: selecting, from the plurality of logic representations, the logic representation using a trained neural network.

In some implementations, the generating a first computer-executable query comprises: generating, using a trained neural network, the first computer-executable query based on the first sequence of symbols.

In some implementations, the method 700 further comprises: obtaining a second natural language query for a second data table and a second computer-executable query corresponding to the second natural language query; obtaining a second set of knowledge representations associated with the second data table, the second set of knowledge representations describing, in a structured manner, knowledge required for understanding a natural language query for the second data table; converting the second natural language query into a second sequence of symbols by replacing, based on the second set of knowledge representations, a plurality of words in the second natural language query with respective symbols in the predetermined symbol table; and generating, at least based on the second sequence of symbols and the second computer-executable query, training data for training the neural network.

Example Implementations

Some example implementations of the subject matter described herein are listed below.

In one aspect, the subject matter described herein provides a computer-implemented method. The method comprises: receiving a first natural language query for a first data table, the first natural language query comprising a plurality of words; obtaining a first set of knowledge representations associated with the first data table, the first set of knowledge representations describing, in a structured manner, knowledge required for understanding a natural language query for the first data table; converting the first natural language query into a first sequence of symbols by replacing, based on the first set of knowledge representations, the plurality of words with respective symbols in a predetermined symbol table; and generating, based on the first sequence of symbols, a first computer-executable query corresponding to the first natural language query.

In some implementations, a knowledge representation in the first set of knowledge representations indicates at least one of the following: a knowledge type described by the knowledge representation, a data column in the first data table related to the knowledge representation, at least one word related to the data column and possibly existing in a natural language query, and semantic information indicated by the at least one word.

In some implementations, the knowledge type described by the knowledge representation comprises one of the following: a first knowledge type describing an entity or a column name of a data column in the first data table, a second knowledge type describing an attribute of a data column in the first data table, and a third knowledge type describing an act related to a data column in the first data table.

In some implementations, the first set of knowledge representations comprises a first knowledge representation of the first knowledge type and the predetermined symbol table comprises a first predetermined symbol corresponding to the first knowledge type, and wherein the replacing the plurality of words with respective symbols in a predetermined symbol table comprises: in response to determining that a first word of the plurality of words matches a column name of a data column in the first data table or matches the at least one word indicated by the first knowledge representation, replacing the first word with the first predetermined symbol.

In some implementations, the first set of knowledge representations comprises a second knowledge representation of the second knowledge type and the predetermined symbol table comprises a second predetermined symbol corresponding to the second knowledge type, and wherein the replacing the plurality of words with respective symbols in a predetermined symbol table comprises: in response to determining that a second word of the plurality of words matches the at least one word indicated by the second knowledge representation, replacing the second word with the second predetermined symbol.

In some implementations, the first set of knowledge representations comprises a third knowledge representation of the third knowledge type and the predetermined symbol table comprises a third predetermined symbol corresponding to the third knowledge type, and wherein the replacing the plurality of words with respective symbols in a predetermined symbol table comprises: in response to determining that a third word of the plurality of words matches the at least one word indicated by the third knowledge representation, replacing the third word with the third predetermined symbol.

In some implementations, the replacing the plurality of words with respective symbols in a predetermined symbol table comprises: in response to determining that a fourth word of the plurality of symbols matches a fourth predetermined symbol in the predetermined symbol table, replacing the fourth word with the fourth predetermined symbol.

In some implementations, the generating a first computer-executable query comprises: converting the first sequence of symbols into a plurality of logic representations by applying a set of deductive rules to the first sequence of symbols, each logic representation corresponding to a predicted semantic meaning of the first natural language query; selecting, from the plurality of logic representations, a logic representation that best matches true semantics of the first natural language query; and generating the first computer-executable query based on the selected logic representation.

In some implementations, the selecting a logic representation comprises: selecting, from the plurality of logic representations, the logic representation using a trained neural network.

In some implementations, the generating a first computer-executable query comprises: generating, using a trained neural network, the first computer-executable query based on the first sequence of symbols.

In some implementations, the method further comprises: obtaining a second natural language query for a second data table and a second computer-executable query corresponding to the second natural language query; obtaining a second set of knowledge representations associated with the second data table, the second set of knowledge representations describing, in a structured manner, knowledge required for understanding a natural language query for the second data table; converting the second natural language query into a second sequence of symbols by replacing a plurality of words in the second natural language query with respective symbols in the predetermined symbol table based on the second set of knowledge representations; and generating, at least based on the second sequence of symbols and the second computer-executable query, training data for training the neural network.

For another aspect, the subject matter described herein provides a computing device. The computing device comprises a processing unit; and a memory coupled to the processing unit and storing instructions thereon which, when executed by the processing unit, cause the device to perform acts comprising: receiving a first natural language query for a first data table, the first natural language query comprising a plurality of words; obtaining a first set of knowledge representations associated with the first data table, the first set of knowledge representations describing, in a structured manner, knowledge required for understanding a natural language query for the first data table; converting the first natural language query into a first sequence of symbols by replacing, based on the first set of knowledge representations, the plurality of words with respective symbols in a predetermined symbol table; and generating, based on the first sequence of symbols, a first computer-executable query corresponding to the first natural language query.

In some implementations, a knowledge representation in the first set of knowledge representations indicates at least one of the following: a knowledge type described by the knowledge representation, a data column in the first data table related to the knowledge representation, at least one word related to the data column and possibly existing in a natural language query, and semantic information indicated by the at least one word.

In some implementations, the knowledge type described by the knowledge representation comprises one of the following: a first knowledge type describing an entity or a column name of a data column in the first data table, a second knowledge type describing an attribute of a data column in the first data table, and a third knowledge type describing an act related to a data column in the first data table.

In some implementations, the first set of knowledge representations comprises a first knowledge representation of the first knowledge type and the predetermined symbol table comprises a first predetermined symbol corresponding to the first knowledge type, and wherein the replacing the plurality of words with respective symbols in a predetermined symbol table comprises: in response to determining that a first word of the plurality of words matches a column name of a data column in the first data table or matches the at least one word indicated by the first knowledge representation, replacing the first word with the first predetermined symbol.

In some implementations, the first set of knowledge representations comprises a second knowledge representation of the second knowledge type and the predetermined symbol table comprises a second predetermined symbol corresponding to the second knowledge type, and wherein the replacing the plurality of words with respective symbols in a predetermined symbol table comprises: in response to determining that a second word of the plurality of words matches the at least one word indicated by the second knowledge representation, replacing the second word with the second predetermined symbol.

In some implementations, the first set of knowledge representations comprises a third knowledge representation of the third knowledge type and the predetermined symbol table comprises a third predetermined symbol corresponding to the third knowledge type, and wherein the replacing the plurality of words with respective symbols in a predetermined symbol table comprises: in response to determining that a third word of the plurality of words matches the at least one word indicated by the third knowledge representation, replacing the third word with the third predetermined symbol.

In some implementations, the replacing the plurality of words with respective symbols in a predetermined symbol table comprises: in response to determining that a fourth word of the plurality of symbols matches a fourth predetermined symbol in the predetermined symbol table, replacing the fourth word with the fourth predetermined symbol.

In some implementations, the generating a first computer-executable query comprises: converting the first sequence of symbols into a plurality of logic representations by applying a set of deductive rules to the first sequence of symbols, each logic representation corresponding to a predicted semantic meaning of the first natural language query; selecting, from the plurality of logic representations, a logic representation that best matches true semantics of the first natural language query; and generating the first computer-executable query based on the selected logic representation.

In some implementations, the selecting a logic representation comprises: selecting, from the plurality of logic representations, the logic representation using a trained neural network.

In some implementations, the generating a first computer-executable query comprises: generating, using a trained neural network, the first computer-executable query based on the first sequence of symbols.

In some implementations, the method further comprises: obtaining a second natural language query for a second data table and a second computer-executable query corresponding to the second natural language query; obtaining a second set of knowledge representations associated with the second data table, the second set of knowledge representations describing, in a structured manner, knowledge required for understanding a natural language query for the second data table; converting the second natural language query into a second sequence of symbols by replacing a plurality of words in the second natural language query with respective symbols in the predetermined symbol table based on the second set of knowledge representations; and generating, at least based on the second sequence of symbols and the second computer-executable query, training data for training the neural network.

For a further aspect, the subject matter described herein provides a computer program product being tangibly stored in a non-transitory computer storage medium and comprising machine-executable instruction which, when executed by a device, cause the device to perform the method of the above aspect.

For a further aspect, the subject matter described herein provides a computer-readable medium stored thereon with machine-executable instructions which, when executed by a device, cause the device to perform the method of the above aspect.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, a special purpose computer, or other programmable data processing apparatuses, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or a server.

In the context of this disclosure, a machine-readable medium may be any tangible medium that may include, or store a program for use by or in connection with an instruction execution system, apparatus, or device. The machine-readable medium may be a machine-readable signal medium or a machine-readable storage medium. A machine-readable medium may include, but not is limited to, an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are included in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
   receiving, at a semantic parsing unit, a first natural language query for a first data table having data in a first field of knowledge, the first natural language query comprising a plurality of words;
   obtaining, via the semantic parsing unit, a first set of knowledge representations extracted from the first data table, the first set of knowledge representations describing, in a structured manner, knowledge required for understanding a natural language query for the first data table in the first field of knowledge, wherein the first set of knowledge representations includes a first knowledge type describing an entity in the first data table and at least one word in the entity, and semantic information related to the at least one word, a second knowledge type describing an attribute of entity data, and a third knowledge type describing an act related to the entity;
   converting, via the semantic parsing unit, the first natural language query into a first sequence of symbols that are universal for multiple data tables corresponding to multiple different fields of knowledge and include semantic information for symbols by replacing, based on the first set of knowledge representations, the plurality of words of the first natural language query with respective symbols in a predetermined symbol table;
   parsing the first sequence of symbols via the semantic parsing unit comprised of a semantic parsing model trained on multiple examples of natural language queries and corresponding knowledge representations expressed as the symbols that are universal and corresponding computer executable queries from different fields of knowledge; and
   generating a first computer-executable query corresponding to the first natural language query without having to retrain the semantic parsing model for different fields of knowledge.

2. The method of claim 1, wherein the first set of knowledge representations indicates a data column in the first data table related to the knowledge representation, and
   wherein at least one word in the first natural language query is replaced with a different word based on a respective symbol in response to matching a respective knowledge representation.

3. The method of claim 2, wherein:
   the first knowledge type describes an entity or a column name of a data column in the first data table,
   the second knowledge type describes an attribute of a data column in the first data table, and the third knowledge type describes an act related to a data column in the first data table.

4. The method of claim 3, wherein the predetermined symbol table comprises a first predetermined symbol corresponding to the first knowledge type and a symbol attribute type, and wherein the replacing the plurality of words with respective symbols in a predetermined symbol table comprises:
in response to determining that a first word of the plurality of words matches a column name of a data column in the first data table or matches the at least one word indicated by the first knowledge representation, replacing the first word with the first predetermined symbol.

5. The method of claim 3, wherein the predetermined symbol table comprises a second predetermined symbol corresponding to the second knowledge type, and wherein the replacing the plurality of words with respective symbols in a predetermined symbol table comprises:
in response to determining that a second word of the plurality of words matches the at least one word indicated by the second knowledge representation, replacing the second word with the second predetermined symbol.

6. The method of claim 3, wherein the predetermined symbol table comprises a third predetermined symbol corresponding to the third knowledge type, and wherein the replacing the plurality of words with respective symbols in a predetermined symbol table comprises:
in response to determining that a third word of the plurality of words matches the at least one word indicated by the third knowledge representation, replacing the third word with the third predetermined symbol.

7. The method of claim 1, wherein the replacing the plurality of words with respective symbols in a predetermined symbol table comprises:
in response to determining that a fourth word of the plurality of symbols matches a fourth predetermined symbol in the predetermined symbol table, replacing the fourth word with the fourth predetermined symbol.

8. The method of claim 1, wherein the generating a first computer-executable query comprises:
converting, via the semantic parsing unit, the first sequence of symbols into a plurality of logic representations by applying a set of deductive rules to the first sequence of symbols, each logic representation corresponding to a predicted semantic meaning of the first natural language query;
selecting, via the semantic parsing model, from the plurality of logic representations, a logic representation that best matches true semantics of the first natural language query via the semantic parsing model; and
generating, via the semantic parsing model, the first computer-executable query based on the selected logic representation and by replacing at least one word in the first natural language query with a word corresponding to one of the first sequence of symbols.

9. The method of claim 8, wherein the selecting a logic representation comprises:
selecting, from the plurality of logic representations, the logic representation using the semantic parsing model.

10. The method of claim 1, wherein the generating a first computer-executable query comprises:
generating, using the trained semantic parsing model, the first computer-executable query based on the first sequence of symbols.

11. The method of claim 10, further comprising:
obtaining a second natural language query for a second data table and a second computer-executable query corresponding to the second natural language query;
obtaining a second set of knowledge representations associated with the second data table, the second set of knowledge representations describing, in a structured manner, knowledge required for understanding a natural language query for the second data table;
converting the second natural language query into a second sequence of symbols by replacing, based on the second set of knowledge representations, a plurality of words in the second natural language query with respective symbols in the predetermined symbol table; and
generating, at least based on the second sequence of symbols and the second computer-executable query, training data for training the neural network.

12. A computing device, comprising: a processing unit; and a memory coupled to the processing unit and storing instructions which, when executed by the processing unit, cause the device to perform acts comprising: receiving, at a semantic parsing unit, a first natural language query for a first data table having data in a first field of knowledge, the first natural language query comprising a plurality of words; obtaining, via the semantic parsing unit, a first set of knowledge representations extracted from the first data table, the first set of knowledge representations describing, in a structured manner, knowledge required for understanding a natural language query for the first data table in the first field of knowledge, wherein the first set of knowledge representations includes a first knowledge type describing an entity in the first data table and at least one word in the entity, and semantic information related to the at least one word, a second knowledge type describing an attribute of entity data, and a third knowledge type describing an act related to the entity; converting, via the semantic parsing unit, the first natural language query into a first sequence of symbols that are universal for multiple data tables corresponding to multiple different fields of knowledge and include semantic information for symbols by replacing, based on the first set of knowledge representations, the plurality of words of the first natural language query with respective symbols in a predetermined symbol table; parsing the first sequence of symbols via the semantic parsing unit comprised of a semantic parsing model trained on multiple examples of natural language queries and corresponding knowledge representations expressed as the symbols that are universal and corresponding computer executable queries from different fields of knowledge; and generating a first computer-executable query corresponding to the first natural language query without having to retrain the semantic parsing model for different fields of knowledge.

13. The device of claim 12, wherein the first set of knowledge representations indicates a data column in the first data table related to the knowledge representation, and wherein at least one word in the first natural language query is replaced with a different word based on a respective symbol in response to matching a respective knowledge representation.

14. The device of claim 12, wherein the generating a first computer-executable query comprises:
converting, via the semantic parsing unit, the first sequence of symbols into a plurality of logic representations by applying a set of deductive rules to the first sequence of symbols, each logic representation corresponding to a predicted semantic meaning of the first natural language query;

selecting, via the semantic parsing model, from the plurality of logic representations, a logic representation that best matches true semantics of the first natural language query via the semantic parsing model; and generating, via the semantic parsing model, the first computer-executable query based on the selected logic representation and by replacing at least one word in the first natural language query with a word corresponding to one of the first sequence of symbols.

15. A computer program product being tangibly stored in a computer storage medium and comprising machine-executable instructions which, when executed by a device, cause the device to perform acts comprising: receiving, at a semantic parsing unit, a first natural language query for a first data table having data in a first field of knowledge, the first natural language query comprising a plurality of words; obtaining, via the semantic parsing unit, a first set of knowledge representations extracted from the first data table, the first set of knowledge representations describing, in a structured manner, knowledge required for understanding a natural language query for the first data table in the first field of knowledge, wherein the first set of knowledge representations includes a first knowledge type describing an entity in the first data table and at least one word in the entity, and semantic information related to the at least one word, a second knowledge type describing an attribute of entity data, and a third knowledge type describing an act related to the entity; converting, via the semantic parsing unit, the first natural language query into a first sequence of symbols that are universal for multiple data tables corresponding to multiple different fields of knowledge and include semantic information for symbols by replacing, based on the first set of knowledge representations, the plurality of words of the first natural language query with respective symbols in a predetermined symbol table; parsing the first sequence of symbols via the semantic parsing unit comprised of a semantic parsing model trained on multiple examples of natural language queries and corresponding knowledge representations expressed as the symbols that are universal and corresponding computer executable queries from different fields of knowledge; and generating a first computer-executable query corresponding to the first natural language query without having to retrain the semantic parsing model for different fields of knowledge.

* * * * *